US012793447B2

(12) United States Patent
Lee et al.

(10) Patent No.: US 12,793,447 B2
(45) Date of Patent: Nov. 10, 2026

(54) APPARATUS AND METHOD FOR CORRECTING DETECTION OF 3D OBJECTS

(71) Applicants: HYUNDAI MOTOR COMPANY, Seoul (KR); KIA CORPORATION, Seoul (KR); Daegu Gyeongbuk Institute of Science and Technology, Daegu (KR)

(72) Inventors: Hyuk Zae Lee, Seoul (KR); Sung Hoon Im, Daegu (KR); Sung Ho Moon, Busan (KR); Jin Woo Bae, Seoul (KR)

(73) Assignees: HYUNDAI MOTOR COMPANY, Seoul (KR); KIA CORPORATION, Seoul (KR); Daegu Gyeongbuk Institute of Science and Technology, Daegu (KR)

( * ) Notice: Subject to any disclaimer, the term of this patent is extended or adjusted under 35 U.S.C. 154(b) by 596 days.

(21) Appl. No.: 18/221,229

(22) Filed: Jul. 12, 2023

(65) Prior Publication Data

US 2024/0203137 A1 Jun. 20, 2024

(30) Foreign Application Priority Data

Dec. 16, 2022 (KR) ........................ 10-2022-0177525

(51) Int. Cl.
*G06V 20/64* (2022.01)
*G06T 7/70* (2017.01)
*G06V 20/56* (2022.01)

(52) U.S. Cl.
CPC ................ *G06V 20/64* (2022.01); *G06T 7/70* (2017.01); *G06V 20/56* (2022.01);
(Continued)

(58) Field of Classification Search
CPC ........ G06V 10/82; G06V 20/58; G06V 20/64; G06V 20/56; G06T 7/70;
(Continued)

(56) References Cited

U.S. PATENT DOCUMENTS 10,823,562 B1 11/2020 Carnahan et al.
10,909,392 B1 2/2021 Chaudhuri et al.
(Continued)

FOREIGN PATENT DOCUMENTS

CN 109726692 A * 5/2019
CN 114723820 A * 7/2022 ............. H04N 23/90
EP 3869392 A1 8/2021

OTHER PUBLICATIONS

Andreas Geiger et al., Vision meets robotics: The KITTI Dataset, The International Journal of Robotics Research, 32(11), 1990, 6 pp.
(Continued)

*Primary Examiner* — Tracy Mangialaschi
(74) *Attorney, Agent, or Firm* — Lempia Summerfield Katz LLC

(57) ABSTRACT

The present disclosure provides a 3D object detection correction apparatus and method. The 3D object detection correction apparatus includes a processor configured to detect a 3D object based on image data. The processor is also configured to correct an error of the detected 3D object based on a difference value of camera information of a vehicle. The 3D object detection correction apparatus also includes a storage configured to store data and algorithms executable by the processor.

18 Claims, 8 Drawing Sheets

(52) U.S. Cl.
CPC ............... *G06T 2207/20081* (2013.01); *G06T 2207/20084* (2013.01); *G06T 2207/30248* (2013.01)

(58) Field of Classification Search
CPC . G06T 2207/30248; G06T 2207/20081; G06T 2207/20084
See application file for complete search history.

(56) References Cited

U.S. PATENT DOCUMENTS

| | | | | |
|---|---|---|---|---|
| 11,216,673 | B2 | 1/2022 | Behrendt | |
| 2017/0178498 | A1* | 6/2017 | Mcerlean | B60K 35/10 |
| 2020/0219316 | A1 | 7/2020 | Baik et al. | |
| 2021/0209797 | A1 | 7/2021 | Lee et al. | |
| 2021/0264196 | A1 | 8/2021 | Abbeloos et al. | |
| 2022/0012466 | A1 | 1/2022 | Taghavi et al. | |

OTHER PUBLICATIONS

Florian Chabot et al., Deep MANTA: a Coarse-to-fine Many-Task Network for joint 2D and 3D vehicle analysis from monocular image, In Proceedings of the IEEE conference on computer vision and pattern recognition, 2017, 10pp.

Xiaozhi Chen et al., Monocular 3D Object Detection for Autonomous Driving, IEEE Conference on Computer Vision and Pattern Recognition (CVPR), 2016, doi: 10.1109/CVPR.2016.236., 10pp.

Xinzhu Ma et al., Delving into Localization Errors for Monocular 3D Object Detection, In Proceedings of the IEEE/CVF Conference on Computer Vision and Pattern Recognition, 2021, 10pp.

Zechen Liu et al., SMOKE: Single-Stage Monocular 3D Object Detection via Keypoint Estimation, In Proceedings of the IEEE/CVF Conference on Computer Vision and Pattern Recognition Workshops, Feb. 24, 2020, arXiv:2002.10111v1, 10pp.

* cited by examiner

APPARATUS AND METHOD FOR CORRECTING DETECTION OF 3D OBJECTS

CROSS-REFERENCE TO RELATED APPLICATION

This application claims the benefit of and priority to Korean Patent Application No. 10-2022-0177525, filed in the Korean Intellectual Property Office on Dec. 16, 2022, the entire contents of which are incorporated herein by reference.

BACKGROUND

(a) Technical Field

The present disclosure relates to a three-dimensional (3D) object detection correction apparatus and a method thereof, and more particularly, to a technique for correcting an unsupervised 3D object detection result based on deep learning.

(b) Description of the Related Art 3D objects are typically estimated and corrected while learning and evaluating a data set in order to detect the 3D objects based on image data.

Such a 3D object correction method shows good performance when it is used in the same environment as that of the learned data set. However, in the case of estimating data taken with a different camera posture (a camera mounted in another vehicle) from that of learning data, performance of estimating a 3D object is rapidly deteriorated.

Accordingly, a 3D object detection system learned with a data set built in a conventional specific environment has a problem in that it is difficult to utilize it for various types of vehicles with different camera setting environments (e.g., different camera mounting angles).

In addition, there is a problem in that data collection cost increases in collecting data for each vehicle and learning through labeling.

The above information disclosed in this Background section is only to enhance understanding of the background of the present disclosure. Therefore, the Background section may contain information that does not form prior art that is already known to a person having ordinary skill in the art to which the present disclosure pertains.

SUMMARY

Embodiments the present disclosure provide a three-dimensional (3D) object detection correction apparatus, and a method thereof, capable of improving 3D object detection performance at low cost by correcting an unsupervised 3D object detection result based on deep learning without adding labeled learning data.

The technical objects of the present disclosure are not limited to the objects mentioned above. Other technical objects not mentioned herein may be more clearly understood by those having ordinary skill in the art to which the present disclosure pertains based on the description below.

According to an embodiment of the present disclosure, a 3D object detection correction apparatus includes a processor configured to detect a 3D object based on image data and to correct an error of the detected 3D object based on a difference value of camera information of a vehicle. The 3D object detection correction apparatus also includes a storage device configured to store data and algorithms executable by the processor.

In an aspect of the present disclosure, the camera information of the vehicle may include a camera position or a camera angle for a particular vehicle type.

In an aspect of the present disclosure, the processor may be configured to correct a position or angle of the detected 3D object.

In an aspect of the present disclosure, the processor may be configured to correct position and angle errors of the detected 3D object by using pose information of 6 degrees of freedom (DOF) in relation to a ground between a first camera of a first vehicle type and a second camera of a second vehicle type.

In an aspect of the present disclosure, the processor may be configured to detect the 3D object using image data of the first camera of the first vehicle type and information of the first camera using an artificial neural network.

In an aspect of the present disclosure, the processor may be configured to implement a backbone for generating a first feature of the image data of the first camera. The processor may also be configured to implement an embedding network for generating a second feature using the information of the first camera.

The processor may further be configured to implement a combiner for generating a third feature by combining the first feature and the second feature. The processor may additionally be configured to implement a 3D head for detecting the 3D object by using the third feature.

In an aspect of the present disclosure, the information of the first camera may include one or both of i) camera intrinsic property information including at least one of a focal length of the first camera, a center point of the first camera, a distortion correction coefficient of the first camera, or a combination thereof, or ii) extrinsic property information including at least one of position information of the first camera, angle information of the first camera, or a combination thereof.

In an aspect of the present disclosure, the processor may be configured to, in detecting a 3D object based on image data of a second camera of a second vehicle type using a network learned based on image data of a first camera of a first vehicle type and information of the first camera, detect a 3D object using the information of the first camera of the first vehicle type and image data of the second camera, and correct an angle and position of the detected 3D object using information of the second camera of the second vehicle type.

In an aspect of the present disclosure, the processor may be configured to correct the angle and position of the detected 3D object using a positional difference between the first camera and the second camera and an angular difference between the first camera and the second camera.

In an aspect of the present disclosure, the processor may be configured to calculate x and y information in which a center point of the 3D object detected based on the information of the first camera is projected as an image as a normal coordinate system value.

In an aspect of the present disclosure, the processor may be configured to calculate the normal coordinate system value as a 3D value by reflecting z information on the normal coordinate system value.

In an aspect of the present disclosure, the processor may be configured to correct the detected 3D object by reflecting a difference between the angle and position of the first camera and the angle and position of the second camera to the calculated 3D value.

In an aspect of the present disclosure, the processor may be configured to detect a 3D object based on image data of a second camera of a second vehicle type based on a coordinate system of a first camera of a first vehicle type. The processor may be configured to correct a position and angle of the 3D object by converting the coordinate system of the first camera into a coordinate system of the second camera.

In an aspect of the present disclosure, the storage is configured to store information of a first camera of a first vehicle type, a network learned based on image data of the first camera, and camera information of a host vehicle.

In an aspect of the present disclosure, the processor may be configured to generate a 3D bounding box including the 3D object by detecting the 3D object. The processor may be configured to correct a position and angle of the 3D object by rotating the 3D bounding box.

According to another embodiment of the present disclosure, a 3D object detection correction method includes detecting, by a processor, a 3D object on image data and correcting, by the processor, an error of the detected 3D object based on a difference value of camera information of a vehicle.

In an aspect of the present disclosure, detecting the 3D object may include generating, by the processor, a first feature of image data of a first camera. Detecting the 3D object may also include generating, by the processor, a second feature using information of the first camera. Detecting the 3D object may further include generating, by the processor, a third feature by combining the first feature and the second feature. Detecting the 3D object may also include detecting, by the processor, a 3D object by using the third feature.

In an aspect of the present disclosure, detecting the 3D object may further include generating, by the processor, a 3D bounding box including the 3D object by detecting the 3D object. Correcting the error of the detected 3D object may include correcting, by the processor, a position and angle of the 3D object by rotating the 3D bounding box.

In an aspect of the present disclosure, detecting the 3D object may include detecting, by the processor, a 3D object based on image data of a second camera of a second vehicle type using a network learned based on image data of a first camera of a first vehicle type and information of the first camera. Correcting the error of the detected 3D object may include correcting, by the processor, an angle and position of the detected 3D object using information of the second camera of the second vehicle type.

In an aspect of the present disclosure, correcting the angle and position of the detected 3D object may include correcting, by the processor, the angle and position of the detected 3D object using a positional difference between the first camera and the second camera and an angular difference between the first camera and the second camera.

According to embodiments of the present disclosure, it may be possible to improve 3D object detection performance at low cost by correcting an unsupervised 3D object detection result based on deep learning without adding labeled learning data.

Furthermore, various effects that can be directly or indirectly identified through this document may be provided.

DETAILED DESCRIPTION

Figure 1:
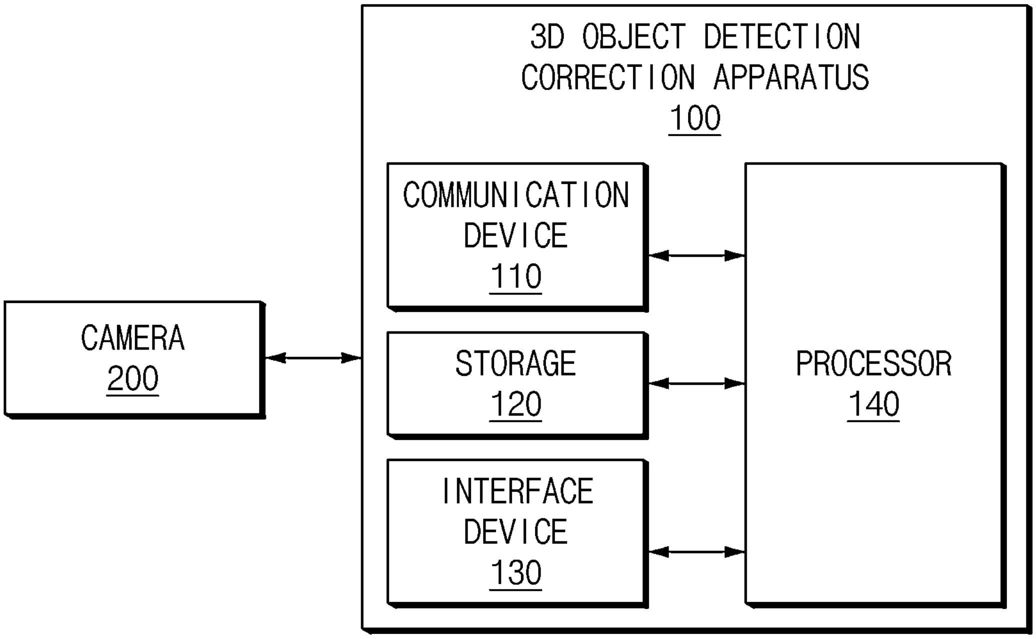
FIG. 1 illustrates a block diagram showing a configuration of an example vehicle system including a 3D object detection correction apparatus, according to an embodiment of the present disclosure.

Hereinafter, embodiments of the present disclosure are described in detail with reference to accompanying drawings. In the accompanying drawings, the same constituent elements have the same reference numerals even when the elements are depicted in different drawings. Furthermore, in describing embodiments of the present disclosure, where it has been determined that detailed descriptions of related well-known configurations, functions, or components may interfere with understanding of the embodiments, the detailed descriptions thereof have been omitted.

In describing constituent elements according to embodiments of the present disclosure, terms such as first, second, A, B, (a), and (b) may be used. These terms are used to distinguish the constituent elements from other constituent elements. The nature, sequences, or orders of the constituent elements are not limited by the terms. Furthermore, all terms used herein, including technical and/or scientific terms have the same meanings as the meanings generally understood by those having ordinary skill in the art to which the present disclosure pertains unless the terms are explicitly defined differently herein. Terms defined in a generally used dictionary should be construed to have meanings consistent with those in the context of a related art and should not be construed to have idealized or excessively formal meanings unless they are clearly defined in the present specification.

When a component, device, element, or the like of the present disclosure is described as having a purpose or performing an operation, function, or the like, the component, device, or element should be considered herein as being "configured to" meet that purpose or perform that operation or function.

Hereinafter, embodiments of the present disclosure are described in detail with reference to FIGS. 1-7.

FIG. 1 illustrates a block diagram showing a configuration of an example vehicle system including a 3D object detection correction apparatus 100, according to an embodiment.

Referring to FIG. 1, the vehicle system according to the embodiment of the present disclosure may include the 3D object detection correction apparatus 100 and a camera 200.

The 3D object detection correction apparatus 100 may be implemented inside or outside the vehicle. For example, the 3D object detection correction apparatus 100 may be integrally formed with internal control units of the vehicle or may be implemented as a separate hardware device configured to be connected to control units of the vehicle by a connection means. In various embodiments, the 3D object detection correction apparatus 100 may be implemented integrally with the vehicle, may be implemented in a form that is installed or attached to the vehicle as a configuration separate from the vehicle, or a part of the 3D object detection correction apparatus 100 may be implemented integrally with the vehicle, and another part of the 3D object detection correction apparatus 100 may be implemented in a form that is installed or attached to the vehicle as a configuration separate from the vehicle.

The 3D object detection correction apparatus 100 may detect a 3D object based on image data based on a learning algorithm and may correct an error of the detected 3D object based on a difference value of camera information of the vehicle. The learning algorithm may include a deep neural network, deep learning, and the like.

The 3D object detection correction apparatus 100 may include a communication device 110, a storage device 120, an interface device 130, and a processor 140.

The communication device 110 may be a hardware device implemented by various electronic circuits to transmit and receive signals through a wireless or wired connection. The communication device 100 may transmit information to and receive information from in-vehicle devices using in-vehicle network communication techniques. The in-vehicle network communication techniques may include controller area network (CAN) communication, local interconnect network (LIN) communication, flex-ray communication, and the like.

In addition, the communication device 110 may perform communication by using a server, infrastructure, or third vehicles outside the vehicle, and the like using a wireless communication technique, such as a wireless Internet access technique, or short range communication technique. The wireless communication technique may include wireless LAN (WLAN), wireless broadband (Wibro), Wi-Fi, world Interoperability for microwave access (Wimax), etc. Short-range communication technique may include bluetooth, ZigBee, ultra wideband (UWB), radio frequency identification (RFID), infrared data association (IrDA), and the like.

As an example, the communication device 110 may receive image data from the camera 200 by communicating with the camera 200.

The storage 120 may store sensing results of the camera 200, data and/or algorithms required for the processor 140 to operate, and the like.

As an example, the storage device 120 may store image data captured by the camera 200 and 3D object information detected from the image data. The storage device 120 may store one or more algorithms learned for object recognition for one or more vehicle types and/or one or more cameras of a vehicle type. As an example, the storage device 120 may store a deep learning-based algorithm, a convolution neural network, and the like. In an example, the storage 120 may store information of a first camera of a first vehicle type, a network learned based on image data of the first camera, and camera information of a host vehicle (e.g., a second vehicle type).

The storage device 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 100 and results thereof. The input means may include a key button, a mouse, a joystick, a jog shuttle, a stylus pen, and the like. Furthermore, the input means may include a soft key implemented on the display.

The interface device 130 may be implemented as a head-up display (HUD), a cluster, an audio video navigation (AVN), or a human machine interface (HMI).

The output device may include a display and may also include a voice output means such as a speaker. In an embodiment, if a touch sensor formed of a touch film, a touch sheet, or a touch pad is provided on the display, the display may operate as a touch screen. The display may be implemented in a form in which an input device and an output device are integrated. In an embodiment of the present disclosure, the output device may output platooning information such as sensor failure information, lead vehicle information, group rank information, a platooning speed, a destination, a waypoint, a path, and the like.

The display may include at least one of a liquid crystal display (LCD), a thin film transistor liquid crystal display (TFT LCD), an organic light emitting diode display (OLED display), a flexible display, a field emission display (FED), a 3D display, or any combination thereof.

The processor 140 may be electrically connected to the communication device 110, the storage device 120, the interface device 130, and the like. The processor 140 may electrically control each of the communication device 110, the storage device 120, the interface device 130, and the like. The processor 140 may be an electrical circuit that executes software commands, thereby performing various data processing and calculations described herein.

The processor 140 may process signals transferred between components of the 3D object detection correction apparatus 100 and may perform overall control such that each of the components can perform its function.

The processor 140 may be implemented in the form of software, or a combination of hardware and software. The processor 140 may be, e.g., an electronic control unit (ECU), a micro controller unit (MCU), or other sub-controllers mounted in the vehicle.

The processor 140 may detect a 3D object based on the image data. The processor 140 may correct an error of the detected 3D object based on a difference value of camera information of the vehicle. For example, the processor 140 may correct a position or angle of the detected 3D object.

The camera information of the vehicle may include a camera position or a camera angle for a particular vehicle type.

The processor 140 may correct position and angle errors of the detected 3D object by using pose information of 6 degrees of freedom (DOF) in relation to a ground between the first camera of a first vehicle type and a second camera of the second vehicle type.

The processor 140 may detect a 3D object using image data of the first camera of the first vehicle type and information of the first camera using an artificial neural network.

The processor 140 may include or otherwise implement a backbone for generating a first feature of the image data of the first camera. The processor 140 may also include or otherwise implement an embedding network for generating a second feature using the information of the first camera and a combiner for generating a third feature by combining the first feature and the second feature. The processor 140 may additionally include or otherwise implement a 3D head for detecting a 3D object by using the third feature. Configurations of the backbone network, the embedding network, the combiner, and the 3D head, according to some embodiments, are described in more detail below with reference to FIGS. 4A-B.

In an embodiment, the information of the first camera may include camera intrinsic property information including at least one of a focal length of the first camera, a center point of the first camera, a distortion correction coefficient of the first camera, or a combination thereof. The information of the first camera may additionally or alternatively include extrinsic property information including at least one of position information of the first camera, angle information of the first camera, or a combination thereof.

In detecting a 3D object based on image data of the second camera of the second vehicle type using a network learned based on the image data of the first camera and the information of the first camera of the first vehicle type, the processor 140 may detect a 3D object using the information of the first camera of the first vehicle type and image data of the second camera. The processor 140 may correct an angle and position of the detected 3D object using information of the second camera of the second vehicle type.

The processor 140 may correct the angle and position of the detected 3D object using a positional difference between the first camera and the second camera and an angular difference between the first camera and the second camera.

The processor 140 may calculate x and y (vertical and horizontal) information in which the center point of the 3D object detected based on the information of the first camera is projected as an image as a normal coordinate system value. The processor 140 may calculate the normal coordinate system value as a 3D value by reflecting z information (depth information) on the normal coordinate system value.

The processor 140 may correct the detected 3D object by reflecting a difference between the angle and position of the first camera and the angle and position of the second camera to the calculated 3D value.

The processor 140 may detect a 3D object based on image data of the second camera of the second vehicle type based on a coordinate system of the first camera of the first vehicle type. The processor 140 may correct a position and angle of the 3D object by converting the coordinate system of the first camera into a coordinate system of the second camera.

The processor 140 may detect the 3D object, generate a 3D bounding box including the 3D object, and correct the position and angle of the 3D object by rotating the 3D bounding box.

At least one camera 200 may be provided at front, rear, and opposite sides of the vehicle. The at least one camera 200 may obtain an image including an obstacle around the vehicle and may provide the obtained image to the 3D object detection correction apparatus 100.

Figure 2:
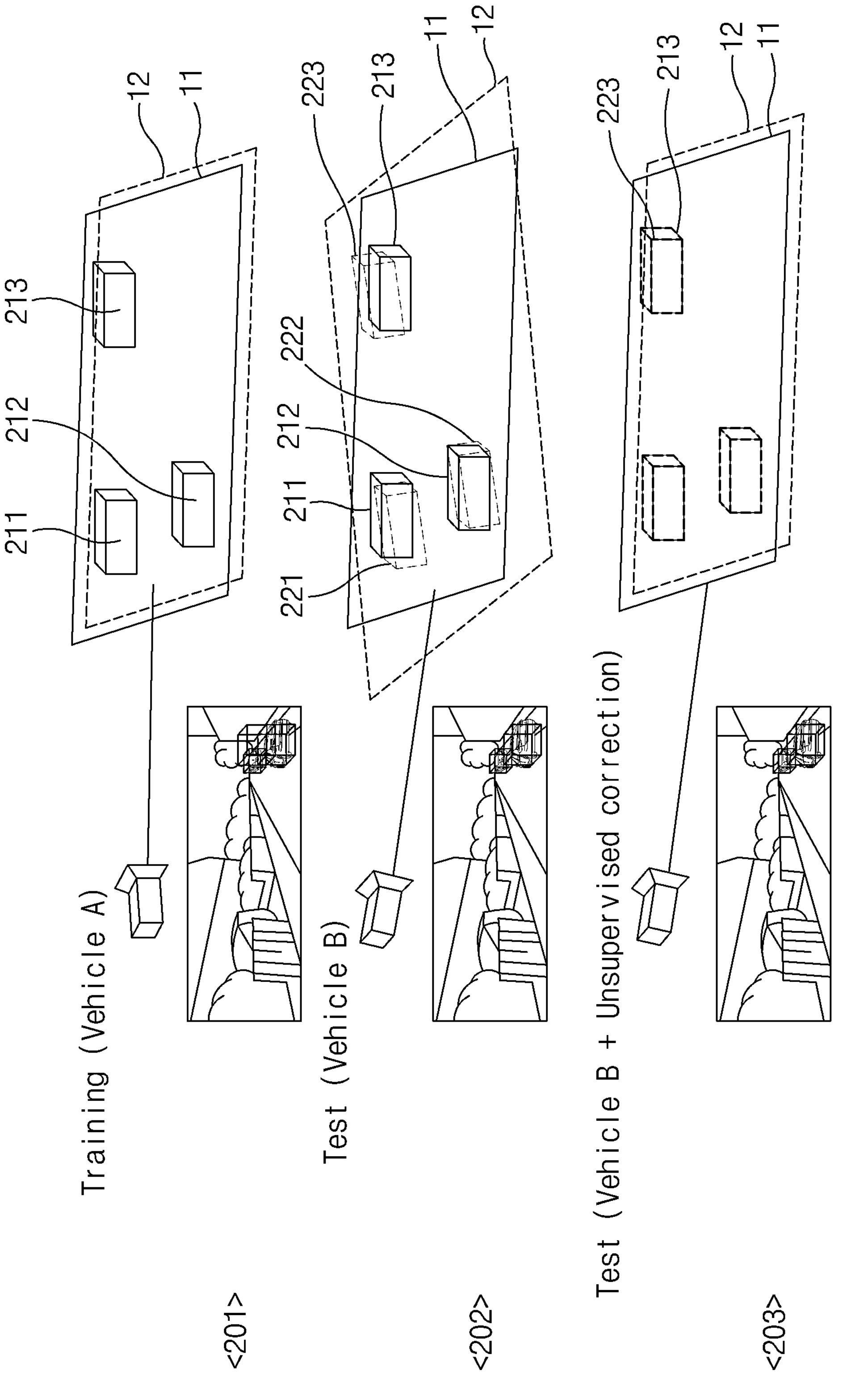
FIG. 2 illustrates several diagrams for describing an example 3D object detection correction process, according to an embodiment of the present disclosure.

FIG. 2 illustrates several diagrams for describing an example 3D object detection process, according to an embodiment.

A diagram 201 depicts an example of 3D object detection based on learning data. A diagram 202 depicts an example of detecting another vehicle, i.e., a 3D object based on new unlearned data. A diagram 203 depicts an example of correcting a 3D object detection result based on the new data depicted in the diagram 202.

Most vehicles are positioned on a same road ground plane 11. As shown in the diagram 201, a 3D object detection algorithm (e.g., neural network) is learned only with data from a specific point in time (e.g., camera viewpoint). Further, 3D object boxes 211, 212, and 213 of a correct answer (ground-truth) used during learning may maintain a certain direction. In an example, the 3D object boxes 211, 212, and 213 may be detected vehicles, and may correspond to the ground-truth. In addition, based on the learned data, the road ground plane 11 and a camera coordinate system 12 maintain the same direction.

If the learned 3D object detection algorithm as depicted in the diagram 201 is applied to a new vehicle that has not been learned, such as depicted in the diagram 202, a 3D object box with a specific direction as learned previously may be extracted by inputting data in which the camera viewpoint is changed according to a mounting angle of the camera to the 3D object detection algorithm (e.g., neural network). As such, the camera viewpoint may be changed, and the direction of the camera coordinate system 12 and the road ground plane 11 may thus be distorted. As depicted in the diagram 202, the 3D object detection algorithm detects a 3D object box without considering this problem, and thus it may be seen that the direction of the 3D object boxes 221, 222, and 223 based on the unlearned data of 202 is distorted compared to the direction and position of the 3D object boxes 211, 212, and 213 based on the learned data.

According to embodiments of the present disclosure, as depicted in the diagram 203, a direction and position of the distorted 3D object boxes 221, 222 and 223 are corrected by converting the camera coordinate system 12 for the 3D object detection result using unsupervised correction so that the direction of the camera coordinate system 12 and the road plane 11 are the same.

The 3D object detection correction apparatus 100 may correct the 3D object detection result using unsupervised learning. Unsupervised learning is a type of machine learning that involves figuring out how data is structured. In unsupervised learning, unlike in supervised learning or reinforcement learning, a target value may not be given as an input value.

Figure 3:
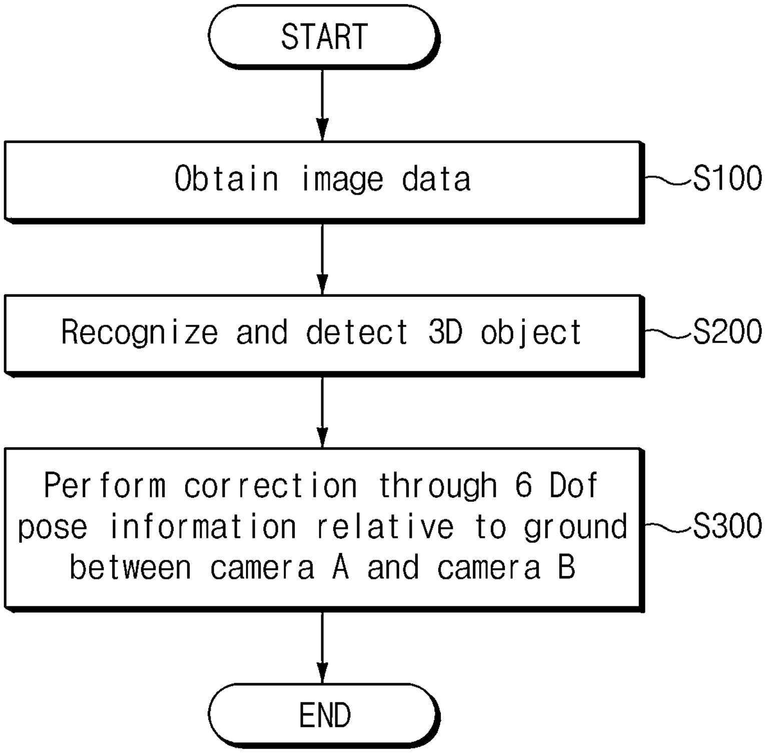
FIG. 3 illustrates a flowchart showing an example 3D object detection correction method, according to an embodiment of the present disclosure.
Figure 4A:
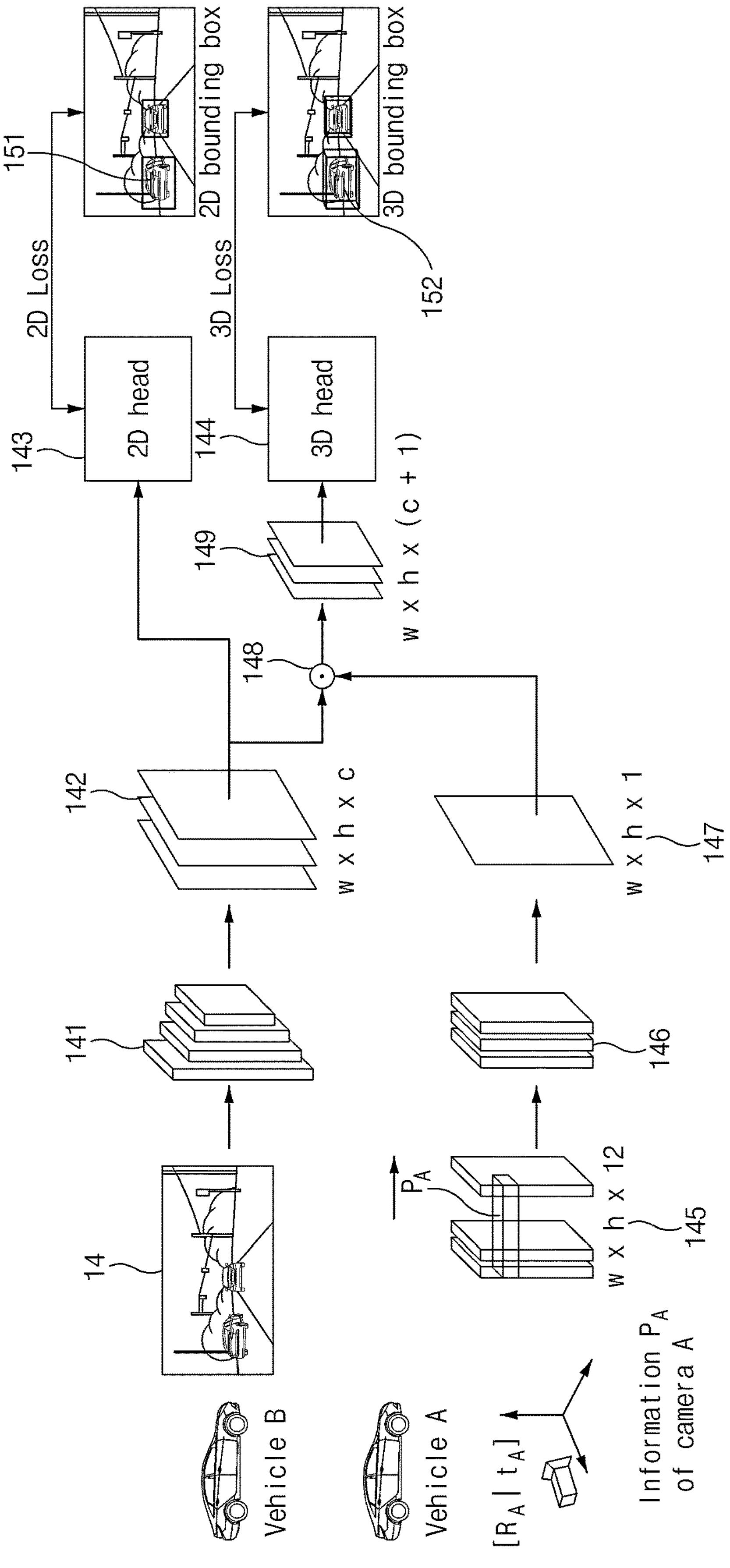
FIG. 4A illustrates a flowchart for describing an example 3D object detection method based on a same vehicle type, according to an embodiment of the present disclosure.
Figure 4B:
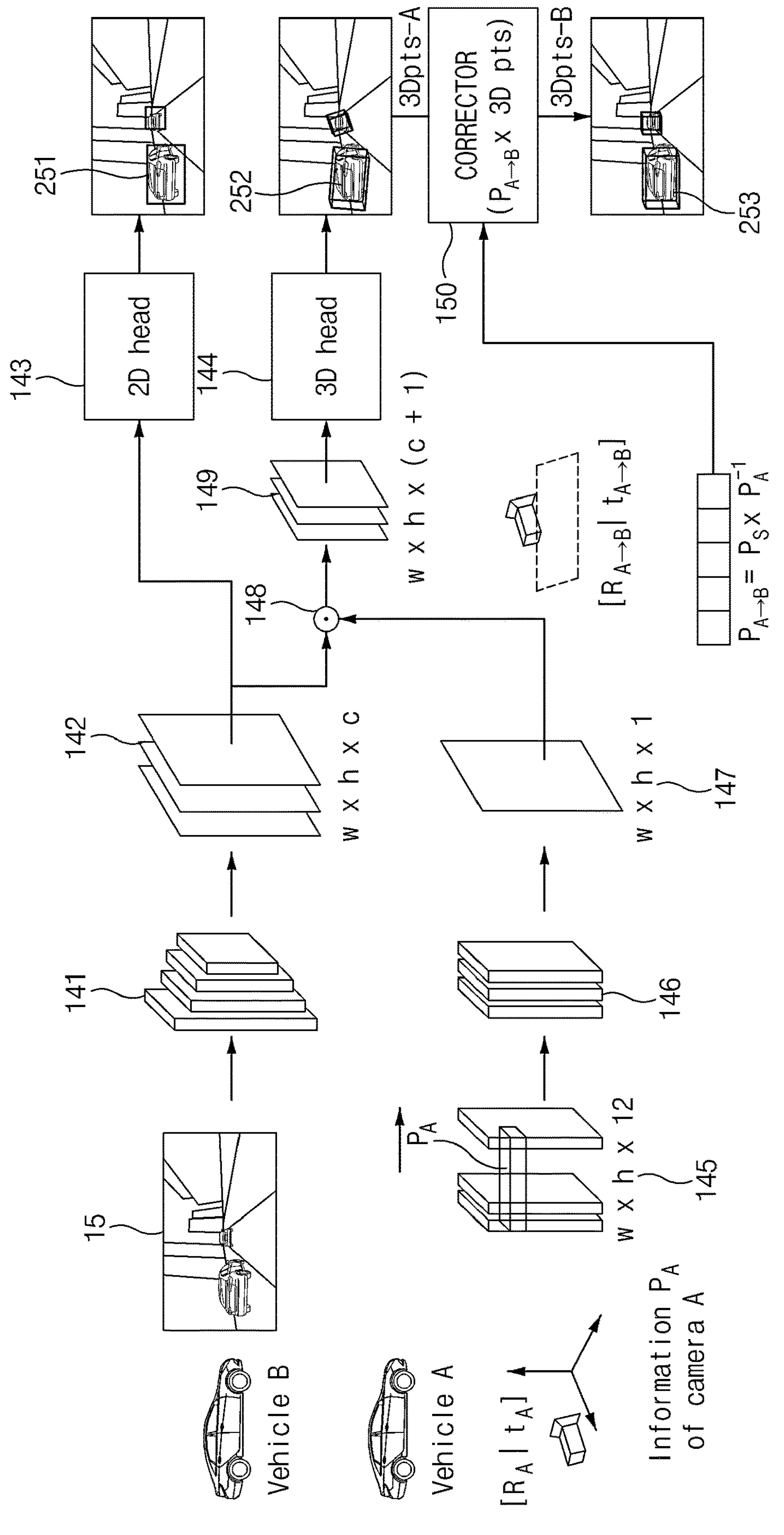
FIG. 4B illustrates a flowchart for describing a method of correcting a 3D object detection result based on different vehicle types, according to an embodiment of the present disclosure.

Hereinafter, a method of detecting and correcting a 3D object according to an embodiment of the present disclosure is described in detail with reference to FIGS. 3-4B. FIG. 3 illustrates a flowchart showing an example 3D object detection correction method, according to an embodiment. FIG. 4A illustrates a flowchart for describing an example 3D object detection method based on a same vehicle type, according to an embodiment. FIG. 4B illustrates a flowchart for describing a method of correcting a 3D object detection result based on different vehicle types, according to an embodiment.

Hereinafter, it is assumed that the 3D object detection correction apparatus 100 of FIG. 1 performs the processes of FIGS. 3-4B. In the description of FIGS. 3-4B, operations described as being performed by the device may be controlled by the processor 140 of the 3D object detection correction apparatus 100.

Referring to FIG. 3, in an operation S100, the 3D object detection correction apparatus 100 may obtain image data. In an operation S200, the 3D object detection correction apparatus 100 may recognize and detect a 3D object based on the obtained image data.

In an operation S300, the 3D object detection correction apparatus 100 may correct a detected 3D object recognition result. The 3D object detection correction apparatus 100 may correct the 3D object recognition result by using pose information of 6 degrees of freedom (DOF) relative to a ground between a camera A and a camera B. The pose information may express a position and pose of different cameras with six variables (x, y, z, roll, pitch, yaw), for example.

Hereinafter, the correction process of the 3D object recognition result described above is described in more detail with reference to FIGS. 4A-B.

Referring to FIG. 4A, the 3D object detection correction apparatus 100 may input image data captured by the camera A of the vehicle A as an input image 14 of a backbone network 141.

The backbone network 141 may use the input image 14 to generate a deep feature 142. The backbone network 141 may use a pretrained network as a convolutional neural networks (CNN) backbone network. The backbone network 141 may be a neural networks structure including several convolutions, activation layers, and batch-normalization.

The backbone network 141 may receive image data having a magnitude of $w_{image} \times h_{image} \times c_{image}$ and may output a feature having a magnitude of w×h×c.

The generated deep feature 142 may be transferred to a two-dimensional (2D) head 143 and a three-dimensional (3D) head 144. The 2D head 143 and the 3D head 144 may output 2D object detection information and 3D object detection information, respectively. The 2D object detection information may include a bounding box 151 of an object such as a vehicle on a 2D image, a size of the bounding box, and the like. The 3D object detection information may include the 3D bounding box 152 of an object such as a vehicle on a 3D camera coordinate system, a depth of the object, a size of the 3D bounding box, and the like.

Information PA (145) of the camera A of the vehicle A may be inputted to an embedding network 146. The embedding network 146 may generate a camera information feature value 147. The embedding network 146 may be a neural network structure including several convolutions and multilayer neural networks (MLPs), for example.

The embedding network 146 may receive the information of the camera A and may output the camera information feature 147 having a magnitude of w×h×1. The camera information feature 147 may include information, such as intrinsic parameters and/or extrinsic parameters, of the camera A. The intrinsic parameters may include a focal length, a center point, a distortion correction factor, etc. of the camera A. The intrinsic parameters may be fixed values for the camera A. The extrinsic parameters may include rotation matrix values, translation matrix values, 6 DoF pose values, and the like.

The information $\overrightarrow{P_A}$ of the camera A may be defined by Equation 1 and Equation 2 below.

$$P_A = [R_A \mid t_A] = \begin{bmatrix} r_1 & r_2 & r_3 & t_1 \\ r_4 & r_5 & r_6 & t_2 \\ r_7 & r_8 & r_9 & t_3 \end{bmatrix} \quad \text{Equation 1}$$

$$\overrightarrow{P_A} = [r_1, r_2, r_3, r_4, r_5, r_6, r_7, r_8, r_9, t_1, t_2, t_3] \quad \text{Equation 2}$$

$P_A$ is a projection matrix that may be calculated from a rotation matrix $R_A$ and a translation matrix $t_A$.

Every pixel value in $w \times h \times c_1$ may have a same value as $r_1$ in $\overrightarrow{P_A}$, and every value in w×h×c; may have a value $\overrightarrow{P_{A_1}}$.

A combiner 148 may generate a feature 149 of w×h×(c+1) by connecting the camera information feature 147 of w×h×1 and the deep feature 142 of w×h×c. The feature 149 may be inputted to the 3D head 144. The 3D head 144 may perform 3D object recognition in consideration of both the information $\overrightarrow{P_A}$ of the camera A and the input image 14, thereby improving 3D object recognition performance.

Accordingly, in recognizing a 3D object, the object recognition performance may be improved by using the feature 149 including the information of the camera A.

The 2D head 143 and the 3D head 144 may perform a location operation for each of the feature 142 and 148. The 2D head 143 and the 3D head 144 may further perform class prediction and may generate, respectively, a 2D object bounding box 151 and a 3D object bounding box 152.

The 2D head 143 and the 3D head 144 may include a neural network structure including several convolutions and rectified linear units (ReLU), for example.

The 2D head 143 may receive a deep feature 147 having a magnitude of w×h×c and may output a feature with a channel suitable for each output. The 3D head 144 may receive a deep feature 147 having a magnitude of w×h×(c+1) and may output a feature with a channel suitable for each output.

Accordingly, FIG. 4A illustrates a process of performing learning for object detection and correction using the information of the camera A of the vehicle A and the image data of the camera A. As illustrated in FIG. 4A, the 3D object recognition performance may be improved by detecting a 3D object not only simply using video data of the camera A, but also considering the information (an angle, a position, etc.) of the camera A of the vehicle A.

Object detection using a camera A and a camera B of different types of vehicles, according to an embodiment, described below in connection with FIG. 4B. FIG. 4B illustrates a flowchart for 3D object detection and correction based on different types of vehicles, according to an embodiment. FIG. 4B illustrates a correction process using camera information of the vehicle A and input image of the vehicle B based on the data learned in FIG. 4A, according to an embodiment.

Referring to FIG. 4B, an image 15 obtained using the camera B mounted in the vehicle B may be inputted to backbone network 141. The backbone network 141 may generate the deep feature 147 of w×h×c.

In addition, information 145 of the camera A of the vehicle A may be inputted to the embedding network 146. The embedding network 146 may generate camera information feature 147 of w×h×1.

The combiner 148 may connect the camera information feature 147 of w×h×1 and the deep feature 142 of w×h×c to generate a feature value 149 of w×h×(c+1). The feature value 149 may be input to the 3D head 144. The 3D head 144 may perform 3D object recognition by considering both the information 145 of the camera A and the input image 15 of the vehicle B, thereby improving the 3D object recognition performance.

The 2D head 143 and the 3D head 144 may generate the 2D object bounding box 251 and the 3D object bounding box 252. The 2D head 143 and the 3D head 144 may send information of the 3D object bounding box 252 to a corrector 150. The corrector 150 may rotate and correct a direction of the 3D object bounding box 152 and may output a final 3D object bounding box 253.

The 3D head 144 may use an output of the embedding network 146, which is a network learned for the camera A, and thus the 3D object bounding box 252 may be created based on the information of the camera A using the input image 15 of the camera B. As a result, a direction of the 3D object bounding box 252 may be distorted (3D pts–A).

Accordingly, the corrector 150 may include a function including a matrix multiple and the like. The corrector 150 may thus output the final 3D object bounding box 253 by correcting a direction of the distorted 3D object bounding box 252 by rotating it by relative camera transformation information $$(P_{A\to B} = P_B \times P_A^{-1})$$

of the camera B with respect to the camera A. The corrector 150 may be included in the processor 140 of FIG. 1, for example.

Accordingly, the corrector 150 may perform correction by multiplying the 3D point (x, y, z) outputted from the 3D head 144 by $P_{A\to B}$, and may output the corrected 3D point (x', y', z').

Equation 3 below defines a projection matrix.

$$s\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad \text{Equation 3}$$

In Equation 3, $$s\begin{bmatrix} u \\ v \\ 1 \end{bmatrix}$$

indicates a 2D image coordinate value.

$$\begin{bmatrix} f_x & 0 & c_x \\ 0 & f_y & c_y \\ 0 & 0 & 1 \end{bmatrix}$$

indicates an intrinsic property.

$$\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}$$

indicates an extrinsic property.

$$\begin{bmatrix} X \\ Y \\ Z \\ 1 \end{bmatrix}$$

indicates a 3D world coordinate value, $$\begin{matrix} r_{11} & r_{12} & r_{13} \\ r_{21} & r_{22} & r_{23} \\ r_{31} & r_{32} & r_{33} \end{matrix}$$

indicates a rotation value from the camera A to the camera B, and $$\begin{matrix} t_1 \\ t_2 \\ t_3 \end{matrix}$$

indicates a position difference value between the cameras. The intrinsic property, which may be a unique attribute for each vehicle type, may include an optical center, scaling, and the like for each vehicle type. The intrinsic property for each vehicle type may be determined and stored in advance, for example.

If 2D coordinates obtained by projecting the 3D information output from the 3D head unit 144 into 2D coordinates are $x_{2d}$, $y_{2d}$, the corrector 150 may multiply it by K−1 as shown in Equation 4 below to calculate an image to normalized image coordinates (homography image) X2d, which is a vector value.

$$p_A^{-1} \to x_{2d} = K^{-1}\begin{bmatrix} x_{2d} \\ y_{2d} \\ 1 \end{bmatrix} \quad \text{Equation 4}$$

In Equation 4, $K^{-1}$ is an inverse value of the intrinsic property of Equation 3. As shown in Equation 4, by multiplying $$\begin{bmatrix} x_{2d} \\ y_{2d} \\ 1 \end{bmatrix}$$

by K−1, camera information of the vehicle A may be removed $$p_A^{-1}.$$

Subsequently, the corrector 150 may calculate $X_{3d}$, which is a 3D value (normalized image coordinates to 3D, homography 3D image coordinate, etc.) expressed in a normal coordinate system as shown in Equation 5 below. The corrector 150 may calculate 3D value $X_{3d}$ expressed in the normal coordinate system by multiplying the normal coordinate system value $X_{2d}$ calculated in Equation 4 by depth information $Z_{3d}$. The depth information $Z_{3d}$ may be 3D information outputted from the 3D head 144.

$$x_{3d} = \begin{bmatrix} x_{2d} * z_{3d} \\ 1 \end{bmatrix} \quad \text{Equation 5}$$

The corrector 150 may further calculate a 3D object detection value $$X'_{3d}$$

(3D from A coordinates to B coordinates) in which a coordinate value of the camera B is reflected by multiplying relative camera information of the vehicle B with respect to the vehicle A by the 3D value $X_{3d}$ expressed in a regular coordinate system calculated in Equation 5, as shown in Equation 6 below:

$$X'_{3d} = \begin{bmatrix} x'_{3d} \\ y'_{3d} \\ z'_{3d} \\ 1 \end{bmatrix} = \left[R^T \mid -R^T t\right] X_{3d} \quad \text{Equation 6}$$

In Equation 6, $R^T$ indicates a rotation value from the camera A to the camera B and $R^T t$ indicates a position difference value between the camera A and the camera B.

In embodiments, vehicles of different types may be equipped with a network learned by a camera A of a vehicle A as illustrated in FIG. 4A. In an example, a vehicle B may detect a 3D object by inputting an acquired image of the vehicle B to a network learned by the camera A and may then correct the detected 3D object as illustrated in FIG. 4B.

In an embodiment, a vehicle, such as the vehicle B, may store camera information (camera angle relative to vehicle A, position, etc.) of the vehicle A in advance in order to correct the detected 3D object.

Accordingly, even if the vehicle B and a vehicle C use the learning network based on the vehicle A, 3D object detection capability may be improved regardless of a type of vehicle by correcting the detected 3D object based on the angle and position of the camera for each of the vehicle B and the vehicle C.

As such, according to embodiments the present disclosure, deterioration of 3D detection performance may be prevented by detecting a 3D object using an existing neural network as is but rotating and converting the 3D object bounding box by the change in the camera mounting angle in the 3D detection result.

Figure 5:
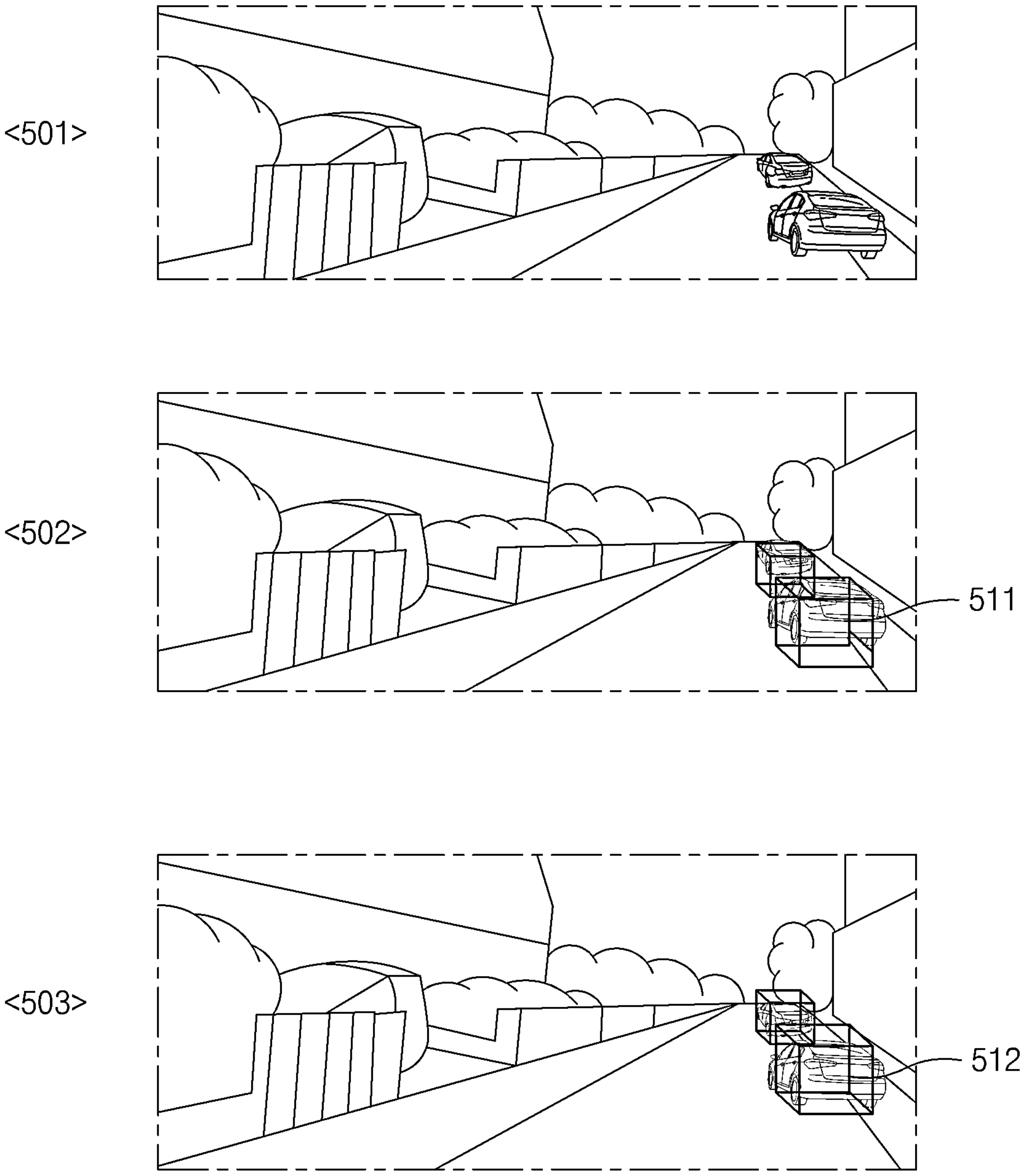
FIG. 5 illustrates an example 3D object detection correction result, according to an embodiment of the present disclosure.
Figure 6:
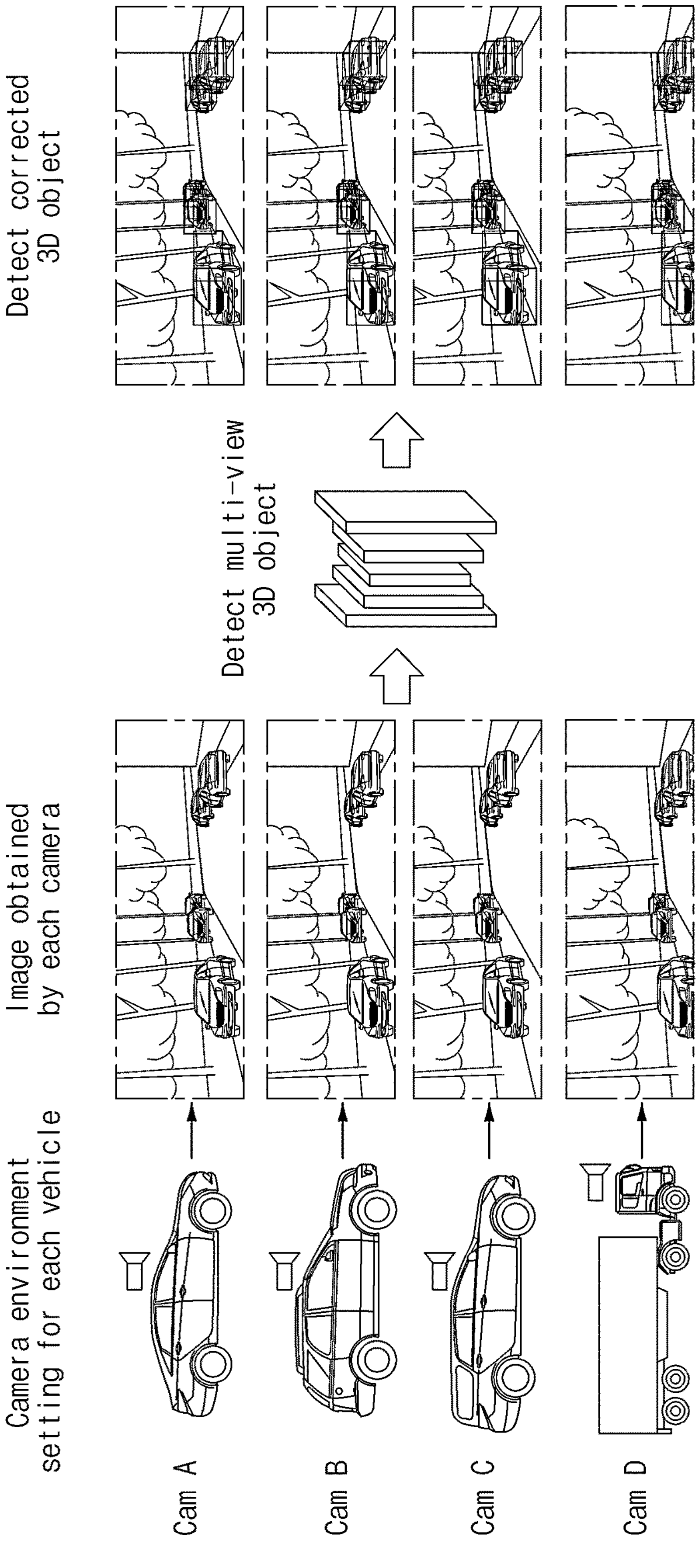
FIG. 6 illustrates another example 3D object detection correction result, according to an embodiment of the present disclosure.

FIG. 5 illustrates an example 3D object detection correction result, according to an embodiment. FIG. 6 illustrates another example 3D object detection correction result, according to an embodiment.

A diagram 501 of FIG. 5 illustrates image data captured by a camera. A diagram 502 illustrates an example of generating a 3D object bounding box 511 by detecting a 3D object. In an embodiment, because the 3D object bounding box 511 is generated without including all of the objects, it needs to be corrected. Accordingly, a diagram 503 illustrates an example in which the 3D object bounding box 512 is corrected by applying the 3D object detection correction method of the present disclosure.

An example of detecting and correcting 3D objects based on image data acquired from cameras having different camera environment settings for each vehicle type, according to an embodiment, is illustrated in FIG. 6.

Figure 7:
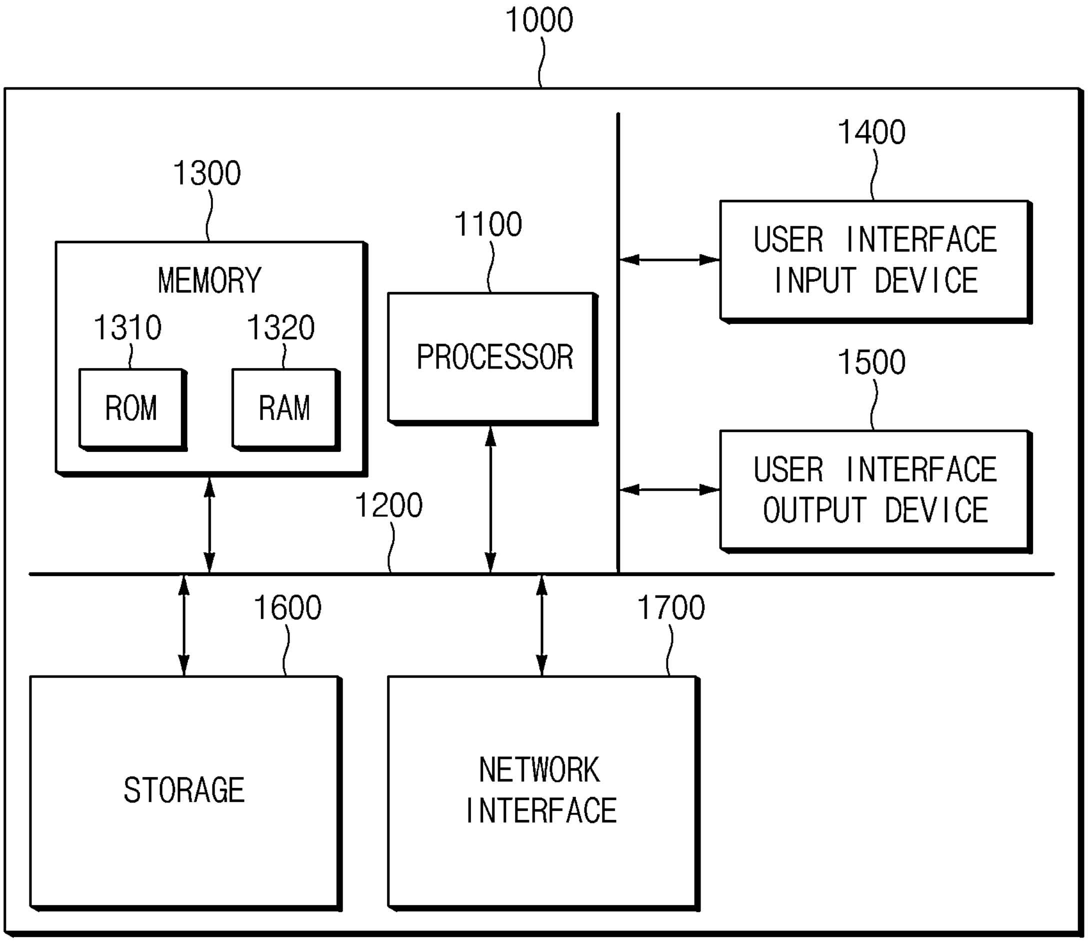
FIG. 7 illustrates an example computing system, according to an embodiment of the present disclosure.

FIG. 7 illustrates an example computing system, according to an embodiment.

Referring to FIG. 7, a computing system 1000 includes at least one processor 1100 connected by a bus 1200 with a memory 1300, a user interface input device 1400, a user interface output device 1500, a storage device 1600, and a network interface 1700.

The processor 1100 may be a central processing unit (CPU) or a semiconductor device that performs processing on commands stored in the memory 1300 and/or the storage device 1600. The memory 1300 and the storage device 1600 may include various types of volatile or nonvolatile storage media. For example, the memory 1300 may include one or both of a read only memory (ROM) 1310 and a random access memory (RAM) 1320.

Accordingly, operations of methods or algorithms described in connection with embodiments of the present disclosure may be implemented by hardware, a software module executed by the processor 1100, or a combination of the two. The software module may reside in a storage medium (e.g., the memory 1300 and/or the storage 1600) such as a RAM memory, a flash memory, a ROM memory, an EPROM memory, an EEPROM memory, a register, a hard disk, a removable disk, and a CD-ROM.

A storage medium may be coupled to the processor 1100. The processor 1100 may read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those having ordinary skill in the art to which the present disclosure pertains may make various modifications and variations without departing from the essential characteristics of the present disclosure.

Embodiments of the present disclosure described above are not intended to limit the technical ideas of the present disclosure but are merely intended to explain them. The scope of the technical ideas of the present disclosure is not limited by these embodiments. The scope of the present disclosure is determined by the appended claims, and all technical ideas within the range equivalent to the amended claims should be interpreted as being included in the scope of the present disclosure.

What is claimed is:

1. A three-dimensional (3D) object detection correction apparatus comprising:

- a processor configured to detect a 3D object on image data and to correct an error of the detected 3D object based on a difference value of camera information of a vehicle; and
- a storage device configured to store data and algorithms executable by the processor,
- wherein the processor is configured to:
  - in detecting a 3D object based on second image data collected from a second camera of a second vehicle type using a network learned based on first image data collected from a first camera of a first vehicle type and information of the first camera of the first vehicle type, detect the 3D object by using information of the first camera of the first vehicle type and the second image data, and
  - correct an angle and position of the detected 3D object by using information of the second camera of the second vehicle type.

2. The 3D object detection correction apparatus of claim 1, wherein the camera information of the vehicle includes a camera position or a camera angle for a particular vehicle type.

3. The 3D object detection correction apparatus of claim 1, wherein the processor is configured to correct a position or angle of the detected 3D object.

4. The 3D object detection correction apparatus of claim 1, wherein the processor is configured to correct position and angle errors of the detected 3D object by using pose information of 6 degrees of freedom (DOF) in relation to a ground between the first camera of the first vehicle type and the second camera of the second vehicle type.

5. The 3D object detection correction apparatus of claim 4, wherein the processor is configured to detect the 3D object using image data of the first camera of the first vehicle type and information of the first camera using an artificial neural network.

6. The 3D object detection correction apparatus of claim 5, wherein the processor is configured to implement:

a backbone for generating a first feature of the image data of the first camera;

an embedding network for generating a second feature using the information of the first camera;

a combiner for generating a third feature by combining the first feature and the second feature; and a 3D head for detecting a 3D object by using the third feature.

7. The 3D object detection correction apparatus of claim 5, wherein the information of the first camera includes one or both of camera intrinsic property information including at least one of a focal length of the first camera, a center point of the first camera, a distortion correction coefficient of the first camera, or a combination thereof, or extrinsic property information including at least one of position information of the first camera, angle information of the first camera, or a combination thereof.

8. The 3D object detection correction apparatus of claim 1, wherein the processor is configured to correct the angle and position of the detected 3D object using a positional difference between the first camera and the second camera and an angular difference between the first camera and the second camera.

9. The 3D object detection correction apparatus of claim 8, wherein the processor is configured to calculate x and y information in which a center point of the 3D object detected based on the information of the first camera is projected as an image as a normal coordinate system value.

10. The 3D object detection correction apparatus of claim 9, wherein the processor is configured to calculate the normal coordinate system value as a 3D value by reflecting z information on the normal coordinate system value.

11. The 3D object detection correction apparatus of claim 10, wherein the processor is configured to correct the detected 3D object by reflecting a difference between the angle and position of the first camera and the angle and position of the second camera to the 3D value.

12. The 3D object detection correction apparatus of claim 1, wherein the processor is configured to:

detect a 3D object based on image data of the second camera of the second vehicle type based on a coordinate system of the first camera of the first vehicle type; and correct a position and angle of the 3D object by converting the coordinate system of the first camera into a coordinate system of the second camera.

13. The 3D object detection correction apparatus of claim 1, wherein the storage device is configured to store information of the first camera of the first vehicle type, the network learned based on first image data of the first camera, and camera information of a host vehicle.

14. The 3D object detection correction apparatus of claim 1, wherein the processor is configured to:

generate a 3D bounding box including the 3D object by detecting the 3D object; and correct a position and angle of the 3D object by rotating the 3D bounding box.

15. A three-dimensional (3D) object detection correction method comprising:

detecting, by a processor, a 3D object based on image data, wherein detecting the 3D object includes detecting a 3D object based on second image data collected from a second camera of a second vehicle type using a network learned based on first image data collected from a first camera of a first vehicle type and information of the first camera of the first vehicle type; and correcting, by the processor, an error of the detected 3D object based on a difference value of camera information of a vehicle, including correcting an angle and position of the detected 3D object by using information of the second camera of the second vehicle type.

16. The 3D object detection correction method of claim 15, wherein detecting the 3D object includes:

generating, by the processor, a first feature of image data of the first camera;

generating, by the processor, a second feature using information of the first camera;

generating, by the processor, a third feature by combining the first feature and the second feature; and detecting, by the processor, a 3D object by using the third feature.

17. The 3D object detection correction method of claim 16, wherein:

detecting the 3D object further includes generating, by the processor, a 3D bounding box including the 3D object by detecting the 3D object; and correcting of the error of the detected 3D object includes correcting, by the processor, a position and angle of the 3D object by rotating the 3D bounding box.

18. The 3D object detection correction method of claim 15, wherein correcting the angle and position of the detected 3D object includes correcting, by the processor, the angle and position of the detected 3D object using a positional difference between the first camera and the second camera and an angular difference between the first camera and the second camera.

* * * * *